United States Patent
Woo

(10) Patent No.: US 12,100,873 B2
(45) Date of Patent: Sep. 24, 2024

(54) POWER SUPPLY SYSTEM OF FUEL CELL USING USER AUTHENTICATION AND METHOD THEREOF

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/386,671

(22) Filed: Nov. 3, 2023

(65) Prior Publication Data
US 2024/0063413 A1 Feb. 22, 2024

Related U.S. Application Data

(63) Continuation of application No. 17/382,161, filed on Jul. 21, 2021, now Pat. No. 11,831,056.

(30) Foreign Application Priority Data

Jul. 22, 2020 (KR) .................. 10-2020-0091211

(51) Int. Cl.
*H01M 8/04858* (2016.01)
*B60L 58/30* (2019.01)
*B60L 58/40* (2019.01)

(52) U.S. Cl.
CPC ......... *H01M 8/04947* (2013.01); *B60L 58/30* (2019.02); *B60L 58/40* (2019.02); *H01M 8/0494* (2013.01); *H01M 2250/20* (2013.01)

(58) Field of Classification Search
CPC ........... H01M 8/04947; H01M 8/0494; H01M 2250/20; B60L 58/40; B60L 58/30
See application file for complete search history.

(56) References Cited

U.S. PATENT DOCUMENTS

| 2003/0105562 A1 | 6/2003 | Hsiao et al. |
| 2011/0084650 A1 | 4/2011 | Kaiser et al. |

(Continued)

FOREIGN PATENT DOCUMENTS

| CN | 105870981 A | 8/2016 |
| KR | 10-2119779 B1 | 6/2020 |

(Continued)

OTHER PUBLICATIONS

Extended European Search Report issued in corresponding European Patent Application No. 21186399.8 dated Dec. 23, 2021.

(Continued)

*Primary Examiner* — Sarah A. Slifka
(74) *Attorney, Agent, or Firm* — MORGAN, LEWIS & BOCKIUS LLP

(57) ABSTRACT

A power supply system of a fuel cell using user authentication includes: a tagging device that receives user information of a user terminal; an identity authentication unit, which compares the user information inputted through the tagging device with previously stored authentication information and outputs a use authority signal when the user information matches the authentication information; a power module complete that produces electric power by a chemical reaction between hydrogen and oxygen; a battery that receives and is charged with electric power produced by the power module complete; an output terminal that is connected to the battery to output electric power stored in the battery; and an integrated body control unit that controls electric power to be outputted through the output terminal when the identity authentication unit outputs the use authority signal.

18 Claims, 3 Drawing Sheets

(56) References Cited

U.S. PATENT DOCUMENTS

| | | |
|---|---|---|
| 2016/0362010 A1 | 12/2016 | Ham et al. |
| 2019/0359073 A1 | 11/2019 | Song et al. |
| 2020/0009984 A1 | 1/2020 | Shiiyama et al. |
| 2020/0031239 A1 | 1/2020 | Chae et al. |

FOREIGN PATENT DOCUMENTS

| | | |
|---|---|---|
| WO | 2004/049490 A2 | 6/2004 |
| WO | 2014/061250 A1 | 4/2014 |

OTHER PUBLICATIONS

Office Action issued in corresponding Chinese Patent Application No. 202110819520.5 dated Jun. 1, 2023, with English translation.
Notice of Allowance issued in corresponding U.S. Appl. No. 17/382,161 dated Oct. 5, 2023.
Office Action issued in corresponding U.S. Appl. No. 17/382,161 dated Mar. 14, 2023.

POWER SUPPLY SYSTEM OF FUEL CELL USING USER AUTHENTICATION AND METHOD THEREOF

CROSS-REFERENCE TO RELATED APPLICATION

This application is the continuation application of U.S. patent application Ser. No. 17/382,161, filed on Jul. 21, 2021, which claims the benefit of priority to Korean Patent Application No. 10-2020-0091211, filed in the Korean Intellectual Property Office on Jul. 22, 2020, the entire contents of which are incorporated herein by reference.

TECHNICAL FIELD

The present disclosure relates to a power supply system of a fuel cell using user authentication, and a method thereof, and more particularly, to a power supply system of a fuel cell using user authentication that allows a driver to supply electric power to an external load of the vehicle without the need to get in the vehicle after authenticating the driver using short-range communication such as NFC or Bluetooth communication, so that a hydrogen fuel cell vehicle may be used as an electric energy source, and a method thereof.

BACKGROUND

In general, a fuel cell electric vehicle (FCEV) generates electricity through a chemical reaction of hydrogen and oxygen in a special device (Stack), and operates a driving motor by using the electric energy to drive the vehicle.

In order to drive a special device (Stack), a stack operation device (Balance of Plant) is required and is composed of the following major categories.

That is, a fuel cell electric vehicle includes control parts such as a stack, BOP (hydrogen/air supply, thermal management), a junction box, a hydrogen/air supply controller, a hydrogen storage device, a battery system, an electric power component, and the like.

Conventional hydrogen fuel cell electric vehicles are focused on safety in terms of using hydrogen as a fuel source and stable output/efficiency of the vehicle. In order to use a current hydrogen fuel cell vehicle as a power source, it was possible when a user (driver) must insert a key into ae vehicle's key set and turn the key to IGN-On, or the user must hold an FOB-Smart key within the range allowed by short-range communication.

SUMMARY

The present disclosure has been made to solve the above-mentioned problems occurring in the prior art while advantages achieved by the prior art are maintained intact.

An aspect of the present disclosure provides a power supply system of a fuel cell using user authentication that allows the fuel cell to supply electric power to an external load of the vehicle without the need for a driver to get in the vehicle after authenticating the driver using short-range communication such as NFC or Bluetooth communication, so that a hydrogen fuel cell vehicle may be used as an electric energy source in the case of outdated industrial sites where electricity supply is impossible, or outdoor activities and camping, which are increasing due to changes in lifestyle, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a power supply system of a fuel cell using user authentication includes a tagging device that receives user information of a user terminal, an identity authentication unit that compares the user information inputted through the tagging device with previously learned authentication information, and outputs a use authority signal when the user information matches the authentication information, a power module complete that produces electric power by a chemical reaction between hydrogen and oxygen, a battery that receives and is charged with electric power produced by the power module complete, an output terminal that is connected to the battery to output electric power stored in the battery, and an integrated body control unit that controls electric power to be output through the output terminal when the identity authentication unit outputs the use authority signal.

According to an embodiment, the tagging device may include a Near-Field Communication (NFC) device that performs NFC with the user terminal, or a Bluetooth device that performs Bluetooth-communication with the user terminal.

According to an embodiment, the battery may include a high-voltage battery that stores a first voltage power through a bidirectional high voltage DC/DC converter that receives electric power produced by the power module complete and converts a voltage of electric power into a first voltage, or a low-voltage battery that stores a second voltage power, the second voltage power having a voltage power lower than that of the first voltage power, through a low voltage DC-DC that receives electric power produced by the power module complete and converts a voltage of electric power into a second voltage to be lower than the first voltage.

According to an embodiment, the output terminal may be disposed adjacent the tagging device, wherein the output terminal includes a high-voltage output terminal connected to the high-voltage battery to output the first voltage power; and a low-voltage output terminal connected to the low-voltage battery to output the second voltage power.

According to an embodiment, the integrated body control unit may control to charge the battery by driving the power module complete when an amount charged in the battery is less than a reference value.

According to an embodiment, when an electric power supply is requested from a vehicle in need of charging, the integrated body control unit may notify the vehicle of whether the power supply system is movable toward the vehicle.

According to another aspect of the present disclosure, a method of controlling a power supply system of a fuel cell using user authentication includes: receiving, by an integrated body control unit of the power supply system, a power providing request from a vehicle requiring electric power; receiving, by a tagging device of the power supply system, user information of a user terminal; comparing, by an identity authentication unit of the power supply system, the user information inputted through the tagging device with previously stored authentication information; upon determining that the user information matches the previously stored authentication information, outputting a use authority signal; and in response to receiving the use authority signal, outputting electric power stored in a battery through an output terminal, which is connected to the battery charged with electric power produced by a power module complete to the vehicle requiring electric power.

According to an embodiment, the receiving of the power providing request may include, upon receiving the power providing request from the vehicle in need of charging and requiring electric power, notifying the vehicle of whether the power supply system is movable toward the vehicle.

According to an embodiment, the receiving of the user information may include performing Near-Field Communication with the user terminal through an NFC device, or Bluetooth communication with the user terminal through a Bluetooth device.

According to an embodiment, the outputting of electric power stored in the battery may include storing a first voltage power in a high-voltage battery through a bidirectional high voltage DC/DC converter that receives electric power produced by the power module complete and converts a voltage of electric power into a first voltage, or storing a second voltage power, the second voltage power having a voltage power lower than that of the first voltage power, in a low-voltage battery through a low voltage DC-DC converter that receives electric power produced by the power module complete and converts the voltage of electric power into a second voltage to be lower than the first voltage.

According to an embodiment, the outputting of electric power stored in the battery may include outputting the first voltage power through a high-voltage output terminal connected to the high-voltage battery, and outputting the second voltage power through a low-voltage output terminal connected to the low-voltage battery.

According to an embodiment, when an amount charged in the battery is less than a preset reference value, the outputting of electric power stored in the battery may include controlling the power supply system to charge the battery by driving the power module complete.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
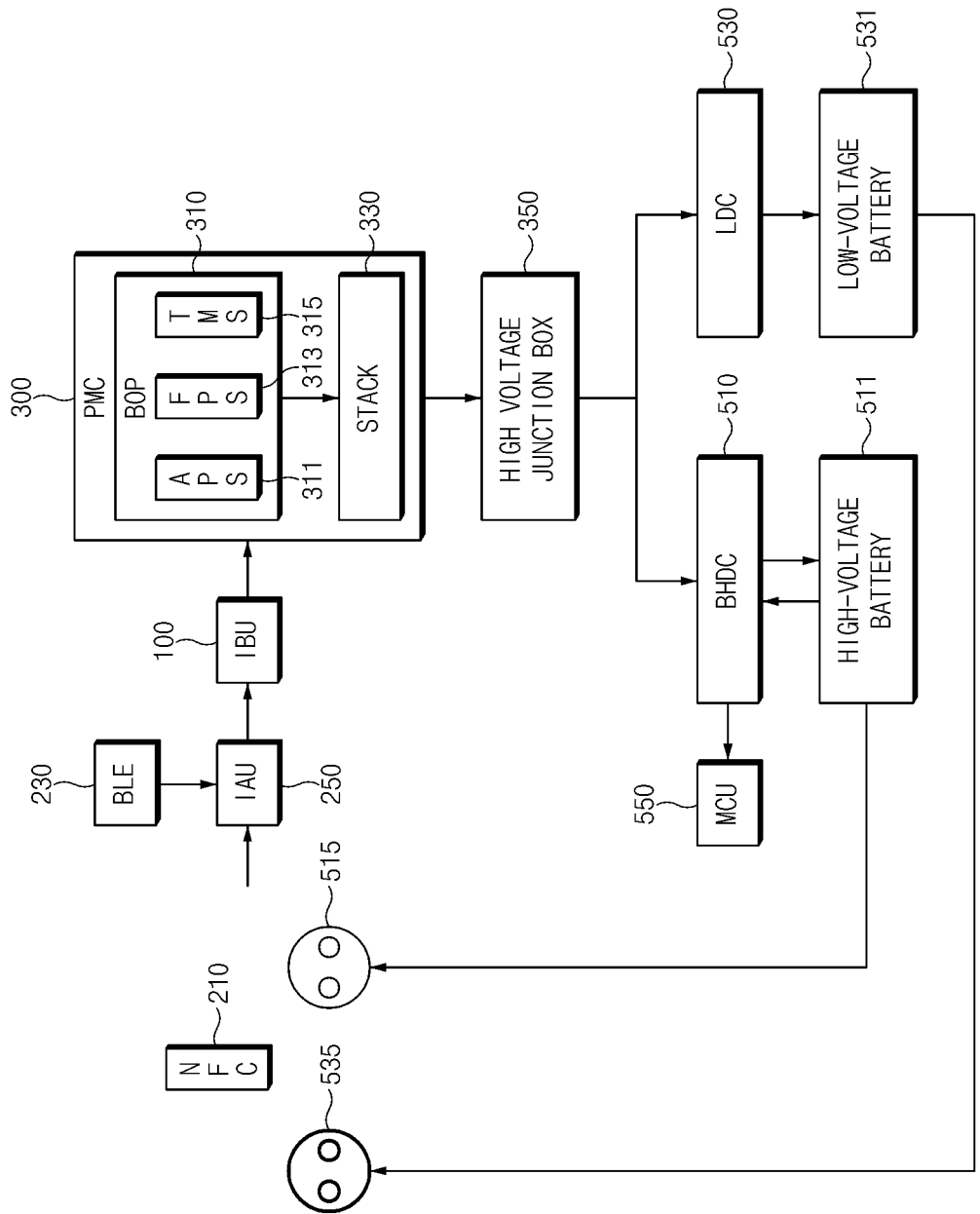
FIG. 1 is a block diagram illustrating a power supply system of a fuel cell using user authentication according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIG. 1, embodiments of the present disclosure will be described in detail.

Figure 2:
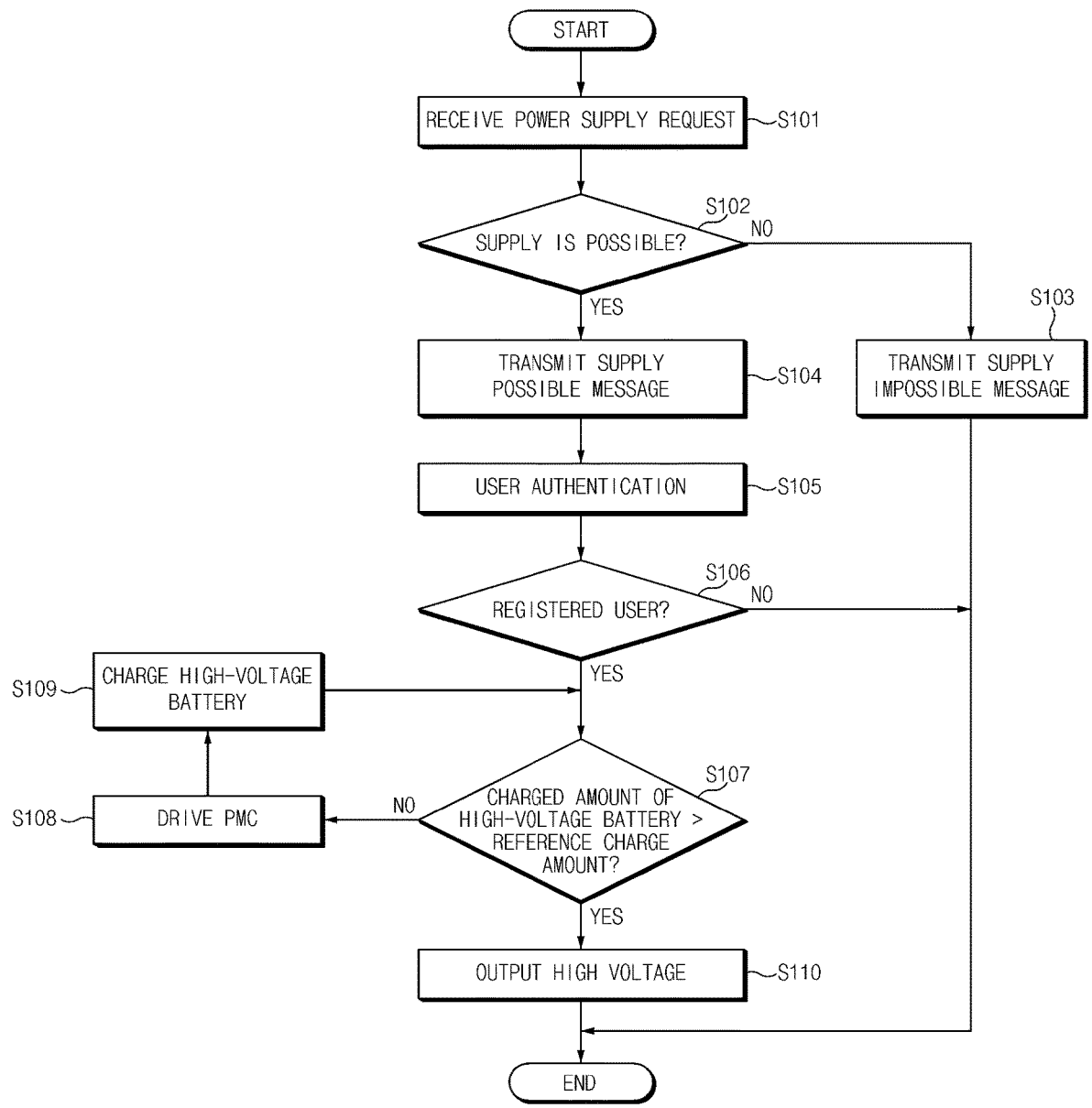
FIG. 2 is a flowchart illustrating the supply of a high voltage in a power supply method of a fuel cell using user authentication according to an embodiment of the present disclosure.
Figure 3:
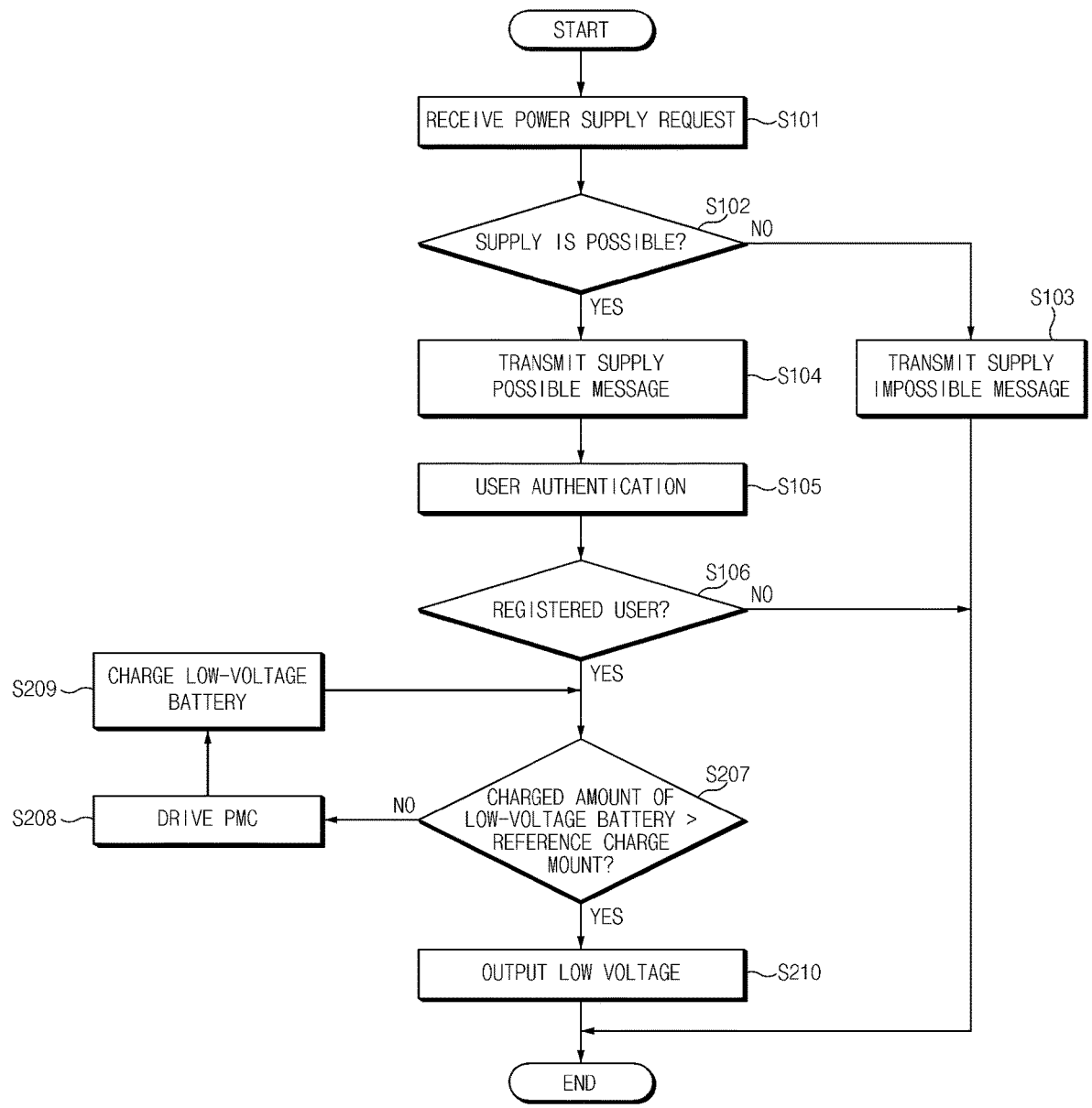
FIG. 3 is a flowchart illustrating the supply of a low voltage in a power supply method of a fuel cell using user authentication according to an embodiment of the present disclosure.

FIG. 1 is a block diagram illustrating a power supply system of a fuel cell using user authentication according to an embodiment of the present disclosure. FIG. 2 is a flowchart illustrating the supply of a high voltage in a power supply method of a fuel cell using user authentication according to an embodiment of the present disclosure. FIG. 3 is a flowchart illustrating the supply of a low voltage in a power supply method of a fuel cell using user authentication according to an embodiment of the present disclosure.

Referring to FIG. 1, a power supply system of a fuel cell using user authentication according to an embodiment of the present disclosure may include a tagging device including an NFC module 210 and a Bluetooth (Bluetooth low energy: BLE) module 230, an identity authentication unit (IAU) 250, a power module complete (PMC) 300, a battery including a high-voltage battery 511 and a low-voltage battery 531, an output terminal including a high output terminal 515 and a low output terminal 535, and an integrated body control unit (IBU) 100.

The NFC module 210 may perform NFC-communication with a user terminal such as a smartphone and the like to receive user information from a user terminal. The Bluetooth module 230 may perform Bluetooth-communication with the user terminal such as a smart phone and the like to receive the user information from the user terminal.

The NFC module 210 and Bluetooth module 230 may be provided on a side of a vehicle.

The IAU 250 may compare the user information input through the NFC module 210 or the Bluetooth module 230 with the authentication information learned in advance, and may output a use authority signal when the user information matches the authentication information.

The power module complete 300, which generates electric power by a chemical reaction of hydrogen and oxygen, may include a fuel cell stack 330 in which fuel cells each including a polymer electrolyte membrane, a fuel electrode, and an air electrode are electrically connected in series, and balance of plant (BOP) 310 for operating the power module complete 300.

The BOP 310 may include an air processing system (APS) 311, a fuel processing system (FPS) 313, a thermal management system (TMS) 315.

Hydrogen supplied from a hydrogen tank to the FPS 313 may be supplied to the fuel cell stack 330 through a hydrogen shutoff valve and a solenoid valve for pressure control to cause an electrochemical reaction.

The generated power of the fuel cell stack 330 may have about 250 V to 450 V.

A high voltage junction box (HV_J/box) 350 may be connected to the power module complete 300, and a bidirectional high voltage DC/DC converter (BHDC) 510 and a low voltage DC-DC (LDC) 530 may be connected to the high voltage junction box 350.

The high-voltage battery 511 may receive the power produced by the fuel cell stack 330, and store relatively high voltage power through the BHDC 510 that converts it into a higher voltage than the generated power of the fuel cell stack 330.

The BHDC 510 may be connected to a motor control unit (MCU) 550 of a motor for driving the vehicle to supply required power to the MCU 550.

The low-voltage battery 531 may receive the power produced through the fuel cell stack 330, and store relatively low voltage power through the LDC 530 that converts it into a lower voltage than the generated power of the fuel cell stack 330.

The high-voltage battery 511 and the low-voltage battery 531 may further include a battery management system (BMS), and may monitor the state of charge (SOC) of power charged from the fuel cell stack 330 to the high-voltage battery 511 and the low-voltage battery 531 through the BMS.

The high output terminal 515, which is provided close to the NFC module 210 and the Bluetooth module 230, may be connected to the high-voltage battery 511 to output the high voltage power charged into the high-voltage battery 511. The low output terminal 535, which is provided close to the NFC module 210 and the Bluetooth module 230, may be connected to the low-voltage battery 531 to output low-voltage power charged into the low-voltage battery 531.

The high output terminal 515 and the low output terminal 535 may be provided on the side of the vehicle to be adjacent to the NFC module 210 and the Bluetooth module 230.

The IBU 100 may control such that power is output through the high output terminal 515 or the low output terminal 535 when the IAU 250 outputs the use authority signal.

The IBU 100 may generate electric power after driving the PMC 300 when the amount charged in the high-voltage battery 511 or the low-voltage battery 531 is less than a preset reference value, and control the high-voltage battery 511 or the low-voltage battery 531 to be charged.

As described above, the power supply system of a fuel cell using user authentication according to an embodiment of the present disclosure may output the power charged in the high-voltage battery 511 to the high output terminal 515, and output the power charged in the low-voltage battery 531 to the low output terminal 535, so that the power supply system serves as a mobile generator.

For example, an electric vehicle equipped with a telematics device may search for a charging station due to insufficient battery charge while driving, and even if a charging station is found, the electric vehicle may not arrive at the charging station with the remaining charge.

In this case, it is possible to search for a hydrogen vehicle equipped with a telematics device in the vicinity by using the telematics device.

When a hydrogen vehicle cannot be searched for at a short distance such as a radius of 500 m, 1 km, or 1.5 km based on the location of the electric vehicle, it is possible to search for a hydrogen vehicle while gradually increasing the distance.

The hydrogen vehicle search process may be repeatedly performed a preset number of times or for a preset time, and when any hydrogen vehicles are not searched for a preset number of times or a preset time, the search process may be stopped.

Then, when a hydrogen vehicle is found, it may be requested whether the corresponding hydrogen vehicle can provide electric power, and when the hydrogen vehicle receives the request for electric power from the electric vehicle in S101, the hydrogen vehicle may determine whether to provide electric power.

Then, when the hydrogen vehicle cannot provide electric power in S102, the hydrogen vehicle may transmit a message indicating that electric power cannot be provided to the electric vehicle by using a telematics device in S103.

In addition, when the hydrogen vehicle can provide electric power in S102, the electric vehicle may transmit a message indicating that electric power can be provided to the electric vehicle by using the telematics device in S104.

Then, the electric vehicle may move to the location where the hydrogen vehicle is located or the hydrogen vehicle may move to the location where the electric vehicle is located.

In S105, the driver of the hydrogen vehicle may perform a user authentication process by contacting a user terminal such as a smartphone to the NFC module 210 or by pairing with the Bluetooth module 230.

Next, by comparing the user information and the previously learned authentication information in the IAU 250, when the user information and the authentication information match, a use authority signal may be output in S106.

Then, the IBU 100 may control to output electric power through the high output terminal 515 or the low output terminal 535.

In S107, when the electric vehicle requires high voltage power and connects the charging plug of the electric vehicle to the high output terminal 515, the IBU 100 may check the SOC of the high-voltage battery 511 to determine whether the charged amount of the high-voltage battery 511 is greater than a reference charge amount.

The reference charge amount, which is a charge amount required to maintain the performance of a battery, may be about 30% of the fully charged amount, which may be changed according to a situation.

Then, in S110, when the charged amount of the high-voltage battery 511 is greater than the reference charge amount, the electric vehicle may be charged by outputting electric power to the high output terminal 515.

Meanwhile, when the charged amount of the high-voltage battery 511 is less than the reference charge amount, the electric vehicle cannot be charged by blocking the output of electric power to the high output terminal 515.

Therefore, when the charged amount of the high-voltage battery 511 is less than the reference charge amount in S107, the PMC 300 is driven in S108 to produce electric power in the fuel cell stack 330, so that the high-voltage battery 511 may be charged in S109.

Similarly, in S207, when the electric vehicle requires low-voltage power and connects the charging plug of the electric vehicle to the low output terminal 535, the IBU 100 may check the SOC of the low-voltage battery 531 to determine whether the charged amount of the low-voltage battery 531 is greater than the reference charge amount.

Next, in S210, when the charged amount of the low-voltage battery 531 is greater than the reference charge amount, the electric vehicle may be charged by outputting electric power to the low output terminal 535.

On the other hand, when the charge amount of the low-voltage battery 531 is less than the reference charge amount, the electric vehicle cannot be charged by blocking the output of power to the low output terminal 535.

Therefore, when the charged amount of the low-voltage battery 531 is less than the reference charge amount in S207, the PMC 300 is driven in S208 to produce electric power in the fuel cell stack 330, so that the low-voltage battery 531 may be charged in S209.

As described above, according to a power supply system of a fuel cell using user authentication, and a method thereof according to the embodiments of the present disclosure, after authenticating the driver using short-range communication such as NFC communication, Bluetooth communication, or the like, it is possible to supply electric power to a load outside a vehicle without the need for the driver to get into the vehicle. In the case of outdated industrial sites where electricity supply is impossible, or outdoor activities and camping, which are increasing due to changes in lifestyle, a hydrogen fuel cell vehicle may be used as an electric energy source, which is a kind of generator.

In addition, like SUVs, whose demand is increasing in connection with modern lifestyles, by efficiently using a fuel cell vehicle as an energy source for outdoor activities or camping, it is possible to increase profits due to the effect of increasing marketability and diversify industries that can resell the generated electricity.

As described above, it is possible to drive home appliances (heaters, audio, video systems and light bulbs) while camping, and drive industrial electric tools (cutter, pump, drill, and the like) that require a three-phase high voltage of 380 V in industrial sites in remote areas where electricity supply is difficult.

Furthermore, when the hydrogen fuel cell power system is used in agriculture, the possibility is sufficient.

As well known in the art, because agricultural sites are far from an electricity supply source, in most cases, an internal combustion engine is used to drive a pump to spray pesticides or turn a generator to supply electric power to agricultural equipment necessary for production.

In the worst case, it is very inefficient to bring the produced agricultural products home and proceed with threshing or additional work corresponding thereto.

When a hydrogen fuel cell vehicle is used as a power source for agricultural machinery in an agricultural site, hydrogen charging stations may be installed all over the country because a variety of demand groups can be secured. Thus, it may bring a positive effect of resolving the anxiety factor of the absence of a charging station to customers who are hesitant to purchase a vehicle due to the absence of a hydrogen charging station.

In addition, although the electric vehicle market is growing in Korea, the growth rate is slower than overseas.

The biggest concern of potential customers who are hesitant to purchase electric vehicles is insufficient electric charging stations across the country.

However, when a hydrogen fuel cell vehicle is used as a power source to charge an electric vehicle with a three-phase high voltage output of 380V, it is determined that it will contribute to the growth of the eco-friendly automobile industry by partially solving the shortage of electric charging stations, which is an obstacle to the growth of the electric vehicle market.

Meanwhile, the power supply method of a fuel cell using user authentication of S101 to S210 according to the embodiments of the present disclosure may be programmed and stored in a computer-readable recording medium.

According to the present technique, after authenticating the driver using short-range communication such as NFC communication, Bluetooth communication, or the like, it is possible to supply electric power to a load outside a vehicle without the need for the driver to get into the vehicle. In the case of outdated industrial sites where electricity supply is impossible, or outdoor activities and camping, which are increasing due to changes in lifestyle, a hydrogen fuel cell vehicle may be used as an electric energy source, which is a kind of generator.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A power supply system of a fuel cell using user authentication, the power supply system comprising:
   a tagging device configured to receive user information of a user terminal;
   an identity authentication unit configured to compare the user information inputted through the tagging device with previously stored authentication information;
   a power module complete (PMC) configured to produce electric power;
   a battery configured to receive and be charged with electric power produced by the PMC;
   an output terminal connected to the battery to output electric power stored in the battery; and
   an integrated body control unit configured to control an output of electric power through the output terminal based on a comparison result of the identity authentication unit,
   wherein the battery includes:
   a high-voltage battery configured to store a first voltage power through a bidirectional high voltage DC/DC converter, which receives electric power produced by the PMC and converts a voltage of electric power into a first voltage; and
   a low-voltage battery configured to store a second voltage power, the second voltage power having a voltage power lower than that of the first voltage power, through a low voltage DC-DC converter, which receives electric power produced by the PMC and converts the voltage of electric power into a second voltage to be lower than the first voltage, and
   wherein the output terminal includes:
   a high-voltage output terminal connected to the high-voltage battery to output the first voltage power; and
   a low-voltage output terminal connected to the low-voltage battery to output the second voltage power.

2. The power supply system of claim 1, wherein the tagging device includes at least one of:
   a Near-Field Communication (NFC) device configured to perform NFC the user terminal; or a Bluetooth device configured to perform Bluetooth communication with the user terminal.

3. The power supply system of claim 1, wherein the output terminal is disposed adjacent the tagging device.

4. The power supply system of claim 1, wherein, when an amount charged in the battery is less than a reference value, the integrated body control unit is configured to control to charge the battery by driving the PMC.

5. The power supply system of claim 1, wherein, when an electric power supply is requested from a vehicle in need of charging, the integrated body control unit is configured to notify the vehicle of whether the power supply system is movable toward the vehicle.

6. The power supply system of claim 1, wherein
when an electric vehicle requires the first voltage power and connects a charging plug of the electric vehicle to the high-voltage output terminal, the integrated body control unit is configured to check a state-of-charge (SOC) of the high-voltage battery.

7. The power supply system of claim 6, wherein
in response to determining that the SOC of the high-voltage battery is greater than a reference value, the integrated body control unit is configured to control to charge the electric vehicle by outputting electric power to the high-voltage output terminal, and
in response to determining that the SOC of the high-voltage battery is less than or equal to the reference value, the integrated body control unit is configured to control to block outputting electric power to the high-voltage output terminal and to charge the high-voltage battery by driving the PMC.

8. The power supply system of claim 1, wherein
when an electric vehicle requires the second voltage power and connects a charging plug of the electric vehicle to the low-voltage output terminal, the integrated body control unit is configured to check a state-of-charge (SOC) of the low-voltage battery.

9. The power supply system of claim 8, wherein
in response to determining that the SOC of the low-voltage battery is greater than a reference value, the integrated body control unit is configured to control to charge the electric vehicle by outputting electric power to the low-voltage output terminal, and
in response to determining that the SOC of the low-voltage battery is less than or equal to the reference value, the integrated body control unit is configured to control to block outputting electric power to the low-voltage output terminal and to charge the low-voltage battery by driving the PMC.

10. A method of controlling a power supply system of a fuel cell using user authentication, the power supply method comprising:
receiving, by an integrated body control unit of the power supply system, a power providing request from a vehicle requiring electric power;
receiving, by a tagging device of the power supply system, user information of a user terminal;
comparing, by an identity authentication unit, the user information inputted through the tagging device with previously stored authentication information; and
in response to receiving a comparison result from the identity authentication unit, controlling an output of electric power stored in a battery through an output terminal based on the comparison result, which is connected to the battery charged with electric power produced by a power module complete (PMC), to the vehicle requiring electric power,
wherein the controlling the output of electric power stored in the battery includes:
outputting a first voltage power through a high-voltage output terminal connected to a high-voltage battery; and
outputting a second voltage power, the second voltage power having a voltage power lower than that of the first voltage power, through a low-voltage output terminal connected to a low-voltage battery.

11. The method of claim 10, wherein the receiving of the power providing request includes upon receiving the power providing request from the vehicle in need of charging and requiring electric power, notifying the vehicle of whether the power supply system is movable toward the vehicle.

12. The method of claim 10, wherein the receiving of the user information includes:
performing Near-Field Communication (NFC) with the user terminal through an NFC device; or
performing Bluetooth communication with the user terminal through a Bluetooth device.

13. The method of claim 10, wherein the controlling the output of electric power stored in the battery includes:
storing the first voltage power in the high-voltage battery through a bidirectional high voltage DC/DC converter, which receives electric power produced by the PMC and converts a voltage of electric power into a first voltage; or
storing the second voltage power in the low-voltage battery through a low voltage DC-DC converter, which receives electric power produced by the PMC and converts the voltage of electric power into a second voltage that is lower than the first voltage.

14. The method of claim 10, wherein the controlling the output of electric power stored in the battery includes when an amount charged in the battery is less than a reference value, controlling the power supply system to charge the battery by driving the PMC.

15. The method of claim 10, wherein the controlling the output of electric power stored in the battery includes
checking a state-of-charge (SOC) of the high-voltage battery when an electric vehicle requires the first voltage power and connects a charging plug of the electric vehicle to the high-voltage output terminal.

16. The method of claim 15, wherein the controlling the output of electric power stored in the battery further includes
charging the electric vehicle by outputting electric power to the high-voltage output terminal in response to determining that the SOC of the high-voltage battery is greater than a reference value, and
blocking outputting electric power to the high-voltage output terminal and charging the high-voltage battery by driving the PMC in response to determining that the SOC of the high-voltage battery is less than or equal to the reference value.

17. The method of claim 10, wherein the controlling the output of electric power stored in the battery includes
checking a state-of-charge (SOC) of the low-voltage battery when an electric vehicle requires the first voltage power and connects a charging plug of the electric vehicle to the low-voltage output terminal.

18. The method of claim 17, wherein the controlling the output of electric power stored in the battery further includes
charging the electric vehicle by outputting electric power to the low-voltage output terminal in response to determining that the SOC of the low-voltage battery is greater than a reference value, and blocking outputting electric power to the low-voltage output terminal and charging the low-voltage battery by driving the PMC in response to determining that the SOC of the low-voltage battery is less than or equal to the reference value.

* * * * *